F. J. OAKES.
DRIVE CHAIN.
APPLICATION FILED DEC. 30, 1915.

1,192,674.

Patented July 25, 1916.
2 SHEETS—SHEET 1.

Inventor
Frank J. Oakes
by his Attorneys
Howson & Howson

F. J. OAKES.
DRIVE CHAIN.
APPLICATION FILED DEC. 30, 1915.

1,192,674.

Patented July 25, 1916.
2 SHEETS—SHEET 2.

Inventor.
Frank J. Oakes
by his Attorneys

UNITED STATES PATENT OFFICE.

FRANK J. OAKES, OF INDIANAPOLIS, INDIANA, ASSIGNOR TO LINK-BELT COMPANY, OF CHICAGO, ILLINOIS, A CORPORATION OF ILLINOIS.

DRIVE-CHAIN.

1,192,674.

Specification of Letters Patent.

Patented July 25, 1916.

Application filed December 30, 1915. Serial No. 69,455.

*To all whom it may concern:*

Be it known that I, FRANK J. OAKES, a citizen of the United States, and a resident of Indianapolis, county of Marion, State of Indiana, have invented certain Improvements in Drive-Chains, of which the following is a specification.

My invention relates to certain improvements in drive chains of the type in which the links of the chain are provided with teeth which engage the teeth of the sprocket wheels around which the chain passes.

One object of my invention is to dispense with rigid guide links and outside plate flange links for retaining the chain on the sprocket wheel.

A further object of the invention is to provide means for partially rotating the pivot pins of the chain so as to shift the surface upon which the links articulate.

Figure 1:
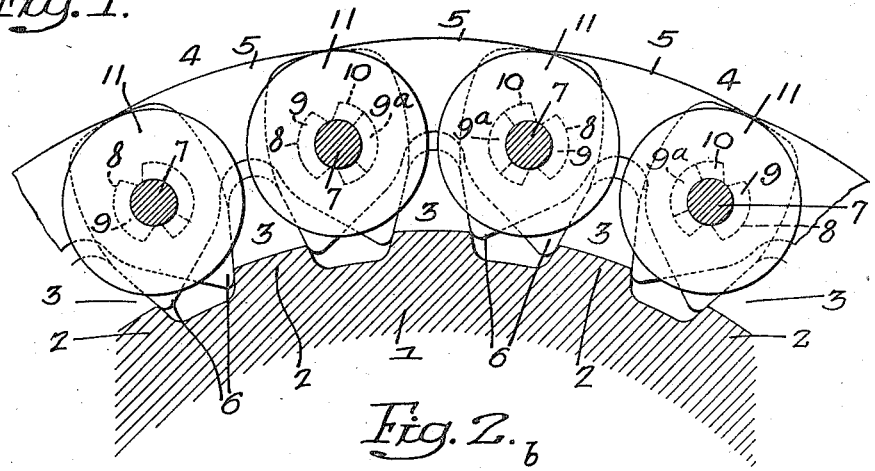
Figure 2:
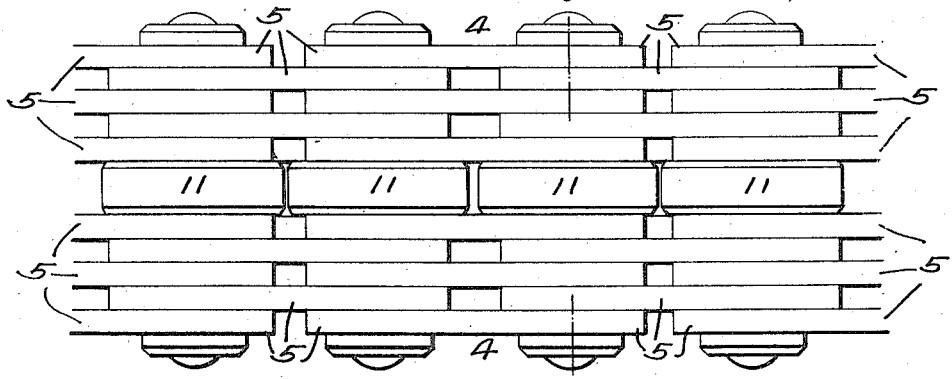
Figure 3:
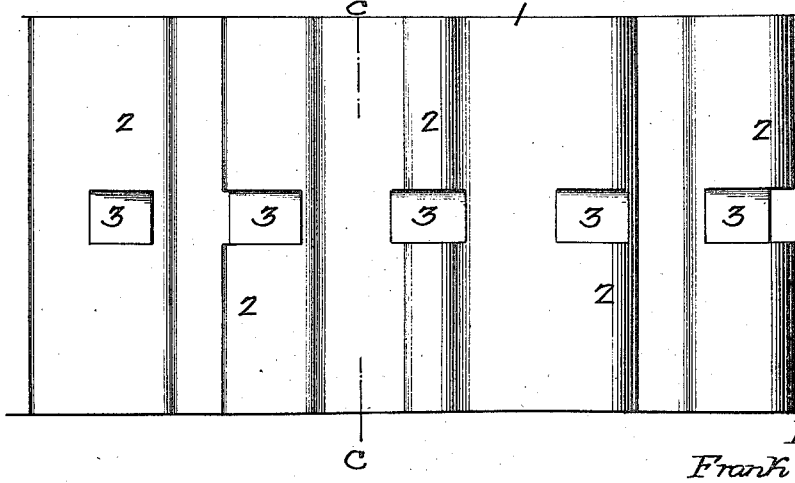
Figure 4:
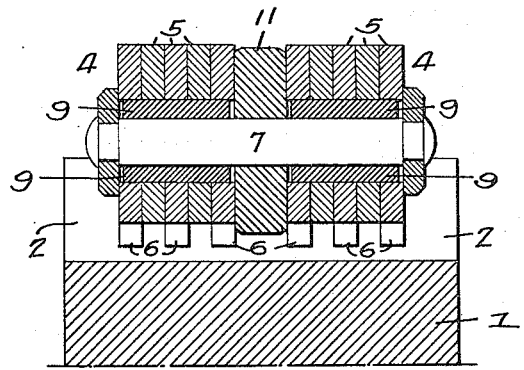
Figure 5:
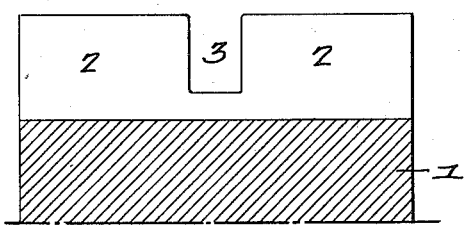
Figure 6:
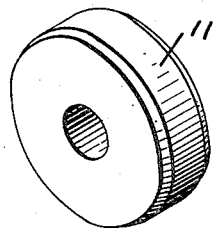
Figure 7:
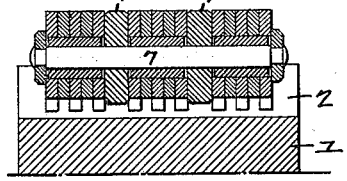

These objects I attain in the following manner, reference being had to the accompanying drawings in which:

Figure 1 is a longitudinal sectional view through a portion of a sprocket wheel and chain illustrating my invention; Fig. 2 is a plan view of Fig. 1; Fig. 3 is a plan view of the wheel with the chain omitted; Fig. 4 is a sectional view on the line *b—b*, Fig. 2; Fig. 5 is a sectional view on the line *c—c*, Fig. 3; Fig. 6 is a perspective view of one of the rollers; and Fig. 7 is a view illustrating a modification.

Referring to the drawings, 1 is a sprocket wheel having teeth 2 and in the periphery of the wheel is an annular channel 3 in the present instance, as shown in Fig. 3, at the center of the wheel, although it may be located at one side or the other of the center without departing from the essential features of the invention.

4 is a chain having links 5, each link being provided with two teeth 6, in the present instance, which engage the teeth 2 of the sprocket wheel. This type of chain is known as a silent toothed drive chain.

7, 7 are the pivot pins for the chain and each alternate set of links has a narrow slot 8 in which snugly fits a segmental bushing 9 which bears upon its pivot pin 7 and extends through elongated slots in adjoining links. At the opposite side of each pivot pin opening is an elongated slot 10 through which extends the segmental bushing $9^a$ of the adjoining link so that as the links articulate on the pivot pin the bushings 9 and $9^a$ are free to rotate with the links and have a movement limited by the length of the slots 10. I lay no claim to this particular feature of the chain as it is already covered by Letters Patent.

Mounted on each pivot pin 7 is a roller 11 of the shape illustrated clearly in Fig. 6. This roller preferably has a driven fit on its pivot pin 7 so that the pivot pin will turn with the roller. The bushings are located on each side of the roller, as shown in the drawings. The roller is of such a diameter that its periphery does not come in contact with the sprocket wheel, but the width of the roller is such that it snugly fits in the groove 3 of the sprocket wheel and the sides of the roller have a frictional bearing upon the side walls of the groove 3, and consequently, as the chain is driven the rollers have a certain limited movement due to this friction and this movement is imparted to the pivot pins of the chain in order to constantly present new surfaces to the bushings of the links so that the rollers not only act as lateral guides for the chain, but also act as means for imparting a limited rotary movement to the pivot pins. It will be noticed that the rollers enter the groove in the sprocket wheel below the pitch line of the chain and this causes less noise than if an extended link were used. Furthermore, this improvement enables a manufacturer to assemble a chain which is in absolute balance per unit, as all of the links are of the same contour and strength. The guide links heretofore employed usually assumed more than their due proportion of the load when the chain was under tension, owing to their greater cross section. I preferably round the corners of each roller, as shown, although the form of the roller may be modified and the roller may, in some instance, be loosely mounted on its pivot pin without departing from one of the essential features of the invention.

In Fig. 7, I have illustrated a modification in which each pintle is provided with two rollers. This is particularly useful in a comparatively wide chain and, in some instances, one roller may have a driven fit on the pintle and the other may be mounted loosely thereon, or both rollers may be secured to the pintle. While I have described the rollers as having a driven fit, they may be secured to the pintle in any manner common in the art.

Although I have illustrated the rollers mounted on all of the pivot pins, in some instances the rollers may be mounted on alternate pivot pins, or may be arranged in any manner desired, the rollers being in such numbers as to hold the chain in proper alinement on the sprocket wheel and where a wide sprocket wheel is used there may be two annular grooves, such as illustrated in Fig. 7, and alternate pivot pins may have rollers staggered thereon so that every other roller may travel in one groove and the intermediate rollers may travel in the other groove.

While I have shown my invention in connection with a chain having segmental bushings, it will be understood that the invention may be used in connection with a chain in which the bushings are not used.

I claim:

1. The combination of a drive chain and a toothed sprocket wheel adapted thereto and having an annular groove extending through the teeth thereof, the said chain being composed of a series of multiple toothed links; pivot pins connecting said links; and rollers mounted on the pivot pins and extending into the annular groove in the sprocket wheel and acting to retain the chain laterally in position.

2. A chain adapted to a sprocket wheel having an annular groove therein, said chain being made of a series of toothed links; pivot pins connecting said links, said pins being loosely mounted in openings in the links; segmental bearings connecting the links of each set and bearing upon the pivot pins; a roller secured to one of the pivot pins and mounted between the sides of the chain and arranged to travel in the groove of the sprocket wheel, the roller being of such a width that it will have a frictional bearing against the side walls of the groove of the sprocket wheel so that, as the teeth of the chain engage the teeth of the sprocket wheel, the roller will have a limited rotary movement which will be imparted to its pivot pin.

3. The combination of a sprocket wheel having teeth and having an annular groove in its periphery, said groove extending part way to the base of the teeth; and a chain composed of sets of series of toothed plates forming links; pivot pins connecting the links; segmental bearings connecting the plates of each series; a roller secured to each pivot pin, said roller being of such diameter that it will clear the base of the groove and being of such width that it will have a frictional contact with the side walls of the groove as it enters the groove, causing the pin to have a limited rotary movement which will be imparted to its pivot pins.

4. The combination of a drive chain and a sprocket wheel adapted thereto and having an annular groove in its periphery, the groove extending through the teeth of the wheel, said chain being composed of a series of links made of toothed plates arranged side by side, the teeth of the plates being arranged to extend into the spaces between the teeth of the wheel; pivot pins connecting the said links; a roller of a diameter to extend into the groove of the wheel when the chain is seated thereon; and segmental bushings connecting the plates of each series, said bushings being located on opposite sides of the roller.

5. The combination of a drive chain and a sprocket wheel adapted thereto and having an annular groove in the periphery thereof, said groove extending through the teeth of the wheel intermediate the sides thereof, said chain composed of a series of links having teeth extending into the spaces between the teeth of the wheel; pivots connecting the links; and rollers mounted on the pivots, said rollers being of a diameter to enter the grooves in the teeth of the wheel when the chain is seated on the wheel so as to hold the chain laterally in position thereon.

FRANK J. OAKES.